(12) United States Patent
Arakawa et al.

(10) Patent No.: US 7,002,093 B2
(45) Date of Patent: Feb. 21, 2006

(54) MANUAL FEED DEVICE IN WIRE ELECTRIC DISCHARGE MACHINE

(75) Inventors: Yasuo Arakawa, Yamanashi (JP); Naotake Takeyama, Aichi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/994,255

(22) Filed: Nov. 23, 2004

(65) Prior Publication Data
US 2005/0115928 A1 Jun. 2, 2005

(30) Foreign Application Priority Data
Nov. 28, 2003 (JP) ............................. 2003-398893

(51) Int. Cl.
*B23H 7/02* (2006.01)
*B23H 7/20* (2006.01)

(52) U.S. Cl. ............................. 219/69.12; 219/69.16; 318/591; 700/162

(58) Field of Classification Search ............ 219/69.12, 219/69.16; 700/162; 318/568.19, 591
See application file for complete search history.

(56) References Cited

U.S. PATENT DOCUMENTS 4,685,064 A * 8/1987 Kinoshita et al. ........... 700/162
5,608,618 A * 3/1997 Kosaka et al. ................ 700/61
6,549,824 B1 * 4/2003 Satou et al. ................. 700/162

FOREIGN PATENT DOCUMENTS

EP 649697 A1 * 4/1995
JP 02-017506 1/1990

* cited by examiner

*Primary Examiner*—Geoffrey S. Evans
(74) *Attorney, Agent, or Firm*—Staas & Halsey LLP

(57) ABSTRACT

A manual feeding device in a wire electric discharge machine in which selection between a jog feed and a step feed is made automatically without mode change. When an axis motion key is pressed, a timer measures the time for which the key is pressed. When the key is turned off before the time measured reaches a predetermined length of time on the basis of which switching to the jog feed is made, the step feed is performed, so that the axis is moved by a predetermined amount. When the key is pressed for the length of time predetermined for switching to the jog feed, the jog feed is started, so that the axis is moved at a low speed. Further, when the key is pressed for a length of time predetermined for switching to a medium speed, the feed axis is moved at the medium speed, and when the key is pressed for a length of time predetermined for switching to a high speed, the axis is moved at the high speed. Since selection between the step feed and the jog feed and selection of the jog feed speed are automatically made depending on the time for which an axis motion key has been pressed, manual feeding operation to move a table and an upper guide is performed easily, so that the positioning of the table and the upper guide is performed easily.

3 Claims, 2 Drawing Sheets

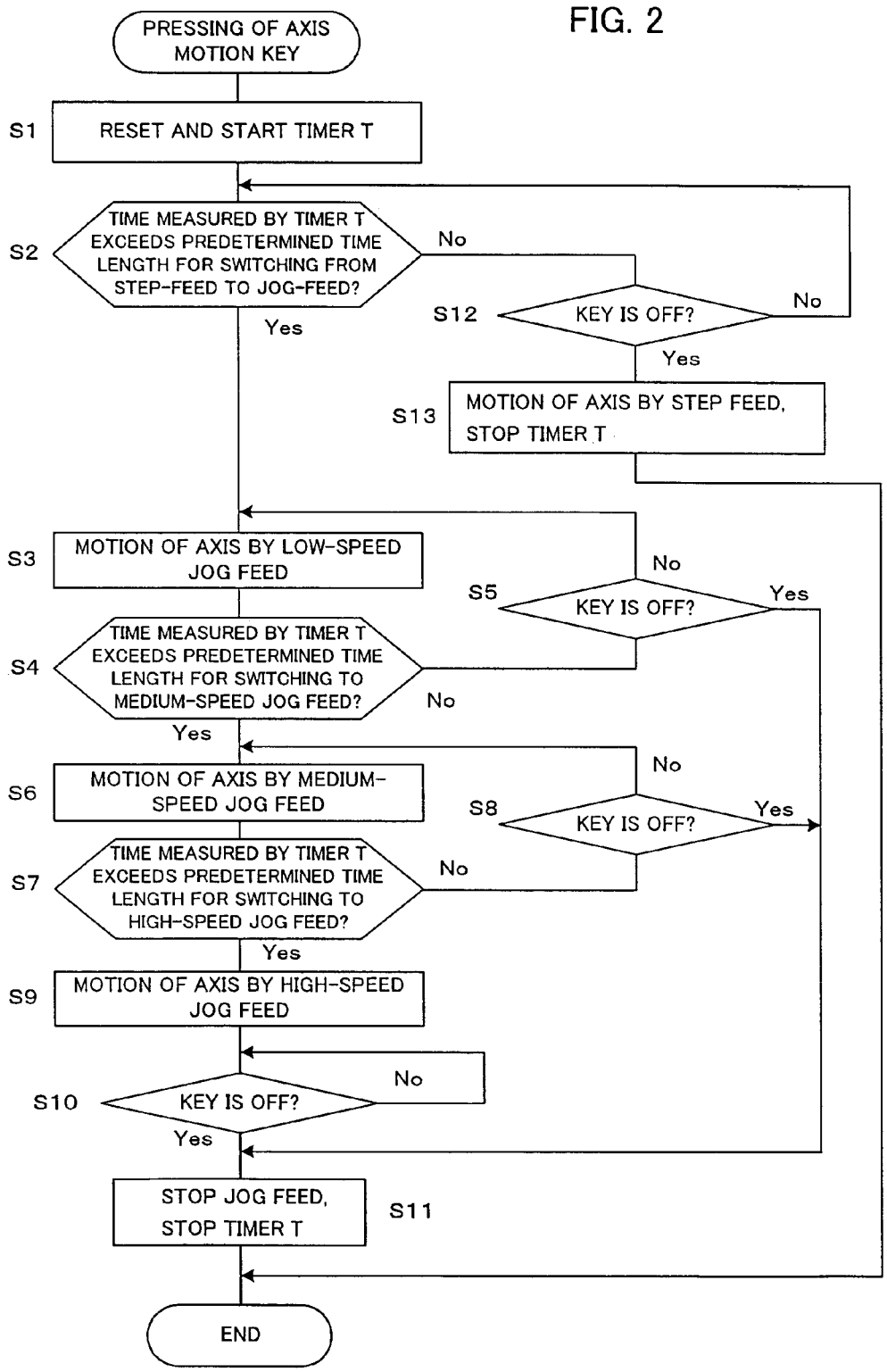

MANUAL FEED DEVICE IN WIRE ELECTRIC DISCHARGE MACHINE

BACKGROUND OF THE INVENTION

1. Field of the Invention

The present invention relates to a wire electric discharge machine, and in particular to a manual feeding device for feeding axes manually to move a workpiece relatively to a wire electrode.

2. Description of Related Art

A wire electric discharge machine machines a workpiece by relatively moving the workpiece to a wire electrode stretched and applying a voltage between the wire electrode and the workpiece to cause electric discharge between the wire electrode and the workpiece. During machining, the workpiece is relatively moved to the machining electrode according to a machining program. However, in preparation before starting machining, such as moving the workpiece to a machining start position, the workpiece or the electrode needs to be moved by manual operation.

In order to relatively move the workpiece to the wire electrode, there are provided mutually perpendicular X, Y and Z axes, and U and V axes for moving one of the wire guides in mutually perpendicular U-axis and V-axis directions to tilt the wire electrode to perform taper machining.

Generally, there are provided X and Y axes for moving a table (workpiece) in X-axis and Y-axis directions, a Z axis for moving an upper guide in a Z-axis direction perpendicular to the X and Y axes, and U and V axes for moving the upper guide in the X-axis and Y-axis directions.

In manual feeding, axis motion keys for the X, Y, Z, U and Z axes are operated to move the axes in the axis directions corresponding to the keys operated. The manual operation includes a jog feed in which an axis is driven continuously while an axis motion key is operated, and a step feed in which an axis is moved by a predetermined amount each time an axis motion key is operated. The jog feed is used to place an axis roughly in an intended position, while the step feed is used to place an axis exactly in an intended position.

Selection between the jog feed and the step feed is made by a selection switch. When the jog feed mode is selected and an axis motion key is operated, the workpiece is relatively moved to the wire electrode in an axis direction corresponding to the operated axis motion key at a predetermined speed. When the step feed is selected and an axis motion key is operated, the workpiece is moved relatively to the wire electrode by a predetermined amount.

There is known an numerical control unit in which speed control in the jog feed is performed such that when the time for which a jog feed key has been operated exceeds a predetermined length of time, the feeding speed is increased by a predetermined amount (see JP 2-17506A).

When a feed axis is driven by manual operation to place it in a machining start position, for example, first the feed axis is moved close to the intended position by the jog feed, and then moved exactly to the intended position by the step feed. Hence, manual operation is performed first in the jog feed mode, and then switched to the step feed mode so that the feed axis can be driven by the step feed. Thus, mode change is needed in the same manual operation, which is inconvenient.

BRIEF DESCRIPTION OF THE DRAWINGS

FIG. 2 is a flow chart showing the process performed when an axis motion key is operated in this embodiment.

SUMMARY OF THE INVENTION

Figure 1:
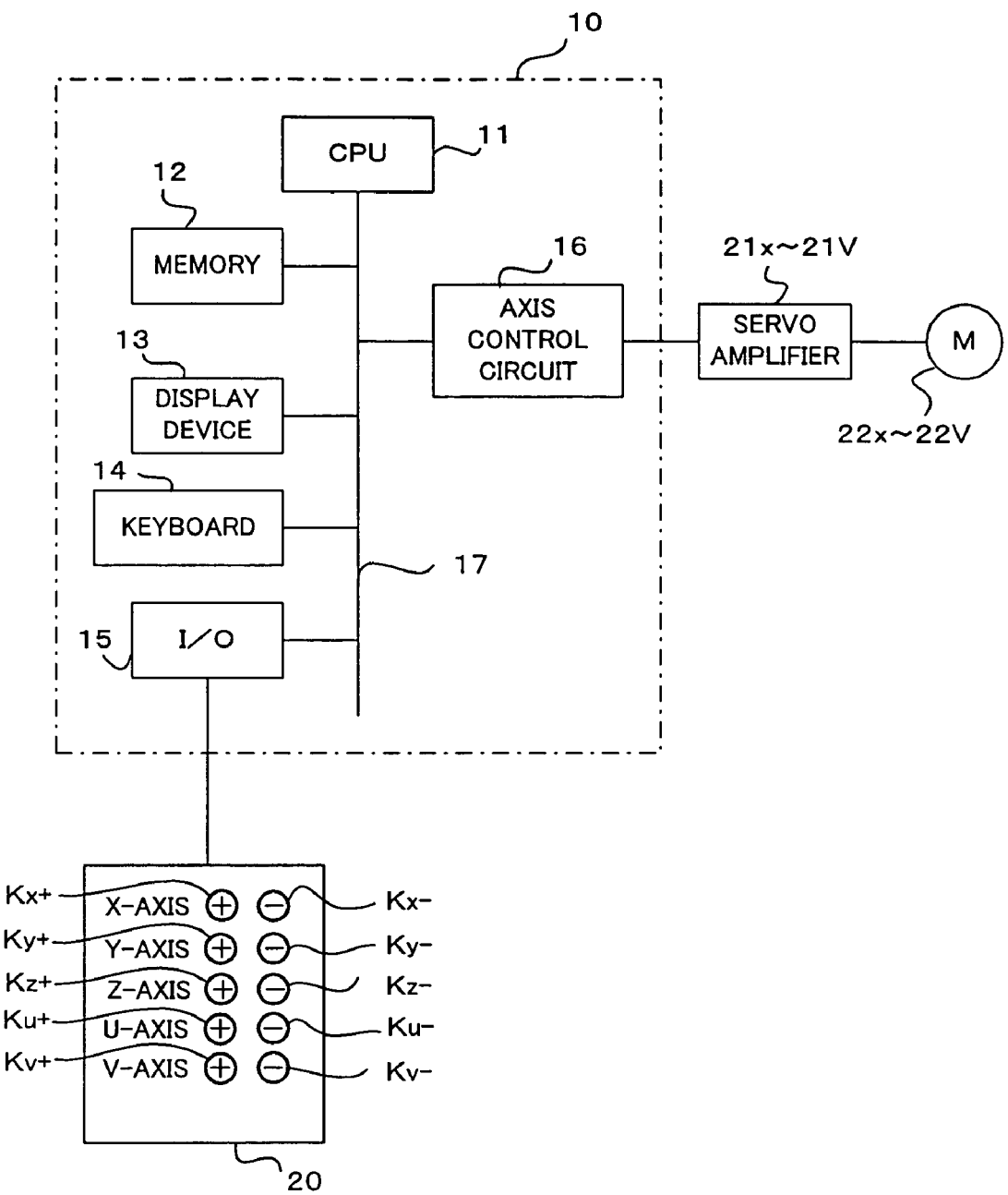
FIG. 1 is a schematic diagram showing relevant elements of an embodiment of the present invention.

The present invention enables selection between a jog feed and a step feed to be automatically made in accordance with an operator's intension without need of mode change.

A manual feeding device of the present invention is provided in a wire electric discharge machine having a manual operation key for manually providing motion of an axis of the wire electric discharge machine. The manual feeding device comprises: measuring means for measuring a continuing time period of an on-state of the manual operation key; determining means for determining whether or not the continuing time period measured by the measuring means exceeds a predetermined time length; step-feeding means for providing motion of the axis by a set amount when it is determined that the continuing time period terminates within the predetermined time length by the determining means; and jog-feeding means for providing motion of the axis at a set speed until the on-state of the manual operation key is discontinued, when it is determined that the continuing time period exceeds the predetermined time length by the determining means.

The jog feeding means may comprise means for switching the set speed for a higher set speed in accordance with length of the continuing time period measured by the measuring means. The predetermined time length may be given by a parameter stored in parameter storage means.

In driving an axis of a wire electric discharge machine by manual operation, if the manual operation key is operated to be on-state continuously for a short time, a step feed is performed, and if the manual operation key is operated to be on-state continuously for a long time, a jog feed is performed. Thus, there is no need to operate a mode selection switch or the like to select the step feed or the jog feed. Hence, operation in manual feed can be performed easily, so that manual positioning can be performed easily.

DETAILED DESCRIPTION

FIG. 1 is a block diagram showing relevant elements of an embodiment of the present invention. A manual feeding device in this embodiment is formed of a control device for controlling a wire electric discharge machine and software. FIG. 1 shows only the elements relevant to the present invention.

In the control device 10 for the wire electric discharge machine, a memory 12 formed of ROM, RAM, etc., a display device 13 such as a liquid crystal display or a CRT display, a keyboard 14, an I/O unit 15 connected to a control panel 20, and axis control circuits 16 for feed axes X, Y, Z, U and V of the wire electric discharge machine are connected to a processor 11 by a bus 17.

The axis control circuits 16 are connected to servo amplifiers $21x$, $21y$, $21z$, $21u$ and $21v$ for the individual axes. These servo amplifiers are connected to servomotors $22x$, $22y$, $22z$, $22u$ and $22v$ for driving the individual feed axes. Although not shown, a detector for detecting position and speed is connected to each of the servomotors $22x$ to $22v$. The position and speed detected is fed back to the associated axis control circuit 16 so that the position and speed of the associated axis will be feedback-controlled by driving the associated one of the servomotors $22x$ to $22v$ via the associated one of the servo amplifiers $21x$ to $21v$. For example, a table to which a workpiece is fitted is moved in X-axis and Y-axis directions by the servomotors driving the X and Y axes, and an upper wire guide is moved in a Z-axis direction, a U-axis direction (parallel to the X axis) and a V-axis direction (parallel to the Y axis) by the servomotors driving the Z, U and V axes.

The control panel 20 comprises axis motion keys $Kx^+$, $Kx^-$, $Ky^+$, $Ky^-$, $Kz^+$, $Kz^-$, $Ku^+$, $Ku^-$, $Kv^+$ and $Kv^-$ to be manually operated for feeding motion instructions to move the feed axes X, Y, Z, U and V in positive and negative directions. For example, the axis motion key $Kx^+$ is provided to move the X axis in a positive direction when pressed.

In respect of the above-described structure, the present invention does not differ from conventional control devices, etc. in wire electric discharge machines. The present invention utilizes a conventional control device of this structure.

FIG. 2 is a flow chart showing the process of manual feeding operation in this embodiment.

In the present invention, a step feed or a jog feed is selected and performed depending on the time for which the on-state of an axis motion key has continued. For this purpose, the value of a parameter giving an on-state duration on the basis of which switching from the step feed to the jog feed is made is entered, for example using the keyboard 14 and stored in the nonvolatile RAM of the memory 12 in advance. Also the values of parameters giving on-state durations on the basis of which the jog feed is switched from a low speed to a medium speed, and from the medium speed to a high speed are set and stored in the memory. The motion amount for the step feed and the speeds for a low-speed jog feed, a medium-speed jog feed and a high-speed jog feed are also set in advance.

When one of the axis motion keys $Kx^+$, $Kx^-$, $Ky^+$, $Ky^-$, $Kz^+$, $Kz^-$, $Ku^+$, $Ku^-$, $Kv^+$ and $Kv^-$ on the control panel 20 is pressed, namely placed in on-state, the processor 11 starts the process shown in FIG. 2. First, the processor 11 resets and starts a timer T for measuring the time for which the on-state of an axis motion key has continued (Step S1). Then the processor 11 reads the time measured by the timer T, and determines whether or not it has reached the predetermined length of time on the basis of which switching from the step feed to the jog feed is made (Step S2). If not, whether the axis motion key pressed is now in off-state or not is determined (Step S12). Steps S2 and S12 are repeated this way. When the axis motion key is turned off before the time measured by the timer T reaches the length of time predetermined for switching from the step feed to the jog feed, the servomotor for driving the axis corresponding to the axis motion key operated is driven in the direction corresponding to the axis motion key operated, by the predetermined amount, and the measurement of time by the timer T is stopped (Step S13). Let us suppose, for example, that the axis motion key $Kx^+$ for motion in the X-axis positive direction was pressed for a moment. The time for which the axis motion key $Kx^+$ was pressed does not reach the length of time predetermined for switching to the jog feed. Hence, the servomotor 22*x* for driving the X axis is driven in the positive direction by the predetermined amount to move the table in the X-axis direction.

When an operator presses an axis motion key for a long time and the time measured by the timer T exceeds the length of time predetermined for switching to the jog feed, the servomotor for the axis corresponding to the axis motion key pressed is driven in the direction corresponding to the axis motion key pressed (positive or negative direction) at the predetermined low speed (Step S3). Then, it is determined whether or not the time measured by the timer T has reached the length of time predetermined for switching to the medium-speed jog feed (Step S4). If not, whether the axis motion key pressed is now in off-state or not is determined (Step S5). If it is still in on-state, Step S3 is taken again. Steps S3, S4 and S5 are repeated this way. During the repetition of Steps S3, S4 and S5, if it is found in Step S5 that the axis motion key pressed is now in off-state, the jog feed is stopped by stopping the driving of the servomotor, and the measurement of time by the timer T is also stopped (Step S11).

Meanwhile, when it is found in Step S4 that the time measured by the timer T has reached the length of time predetermined for switching to the medium-speed jog feed, the jog feed is switched to the medium speed by driving the servomotor for the feed axis at the predetermined medium speed (Step S6). Then, it is determined whether or not the time measured by the timer T has reached the length of time predetermined for switching to the high-speed jog feed (Step S7). If not, it is determined whether or not the axis motion key pressed is now in off-state (Step S8). If it is still in on-state, Step S6 is taken again. Steps S6, S7 and S8 are repeated this way, during which the feed axis is driven at the predetermined medium speed. During the repetition of Steps S6, S7 and S8, if it is found that the axis motion key pressed is now in off-state (Step S8), Step S11 is taken, namely the timer is stopped and the jog feed is stopped.

When the time measured by the timer T has reached the length of time predetermined for switching to the high-speed jog feed, the jog feed is switched to the high speed by driving the servomotor for the axis at the predetermined high speed (Step S9). Then, whether the axis motion key has been tuned off or not is monitored (Step S10), and when it is found that the axis motion key is in off-state, the jog feed and the measurement of time by the timer T are stopped (Step S11).

When a feed axis should be roughly placed in an intended position, the jog feed is selected by pressing a corresponding axis motion key for a long time. While the axis motion key is pressed, the feed axis is driven to move in the direction corresponding to the axis motion key pressed. Further, when the axis motion key continues to be pressed longer, the feeding speed is increased stepwise. This means that the speed at which the feed axis is jog-fed can be selected by adjusting the time for which the axis motion key is pressed. When a feed axis should be exactly placed in an intended position after roughly placed, a corresponding axis motion key is pressed for a moment (for a time shorter than the length of time predetermined for switching to the jog feed). By this, the step feed is performed, namely the feed axis is driven by the predetermined amount, so that it is placed exactly in the intended position.

The embodiment described above is arranged so that the jog feed is switched between three levels of speed, namely the low, medium and high speeds, depending on the time for which an axis motion key has continued to be pressed. However only one jog feed speed may be provided, or in other words, the jog feed speed may be constant. Conversely, more than three levels of jog feed speed may be provided such that the jog feed can be switched between four or five levels of speed, depending on the time for which an axis motion key has continued to be pressed.

What is claimed is:

1. A manual feeding device in a wire electric discharge machine having a manual operation key for manually providing motion of an axis of the wire electric discharge machine, comprising:

measuring means for measuring a continuing time period of an on-state of the manual operation key;

determining means for determining whether or not the continuing time period measured by said measuring means exceeds a predetermined time length;

step-feeding means for providing motion of the axis by a set amount when it is determined that the continuing time period terminates within the predetermined time length by said determining means; and jog-feeding means for providing motion of the axis at a set speed until the on-state of the manual operation key is discontinued, when it is determined that the continuing time period exceeds the predetermined time length by said determining means.

2. A manual feeding device in a wire electric discharge machine according to claim 1, wherein said jog feeding means comprises means for switching the set speed for a higher set speed in accordance with length of the continuing time period measured by said measuring means.

3. A manual feeding device in a wire electric discharge machine according to claim 1, wherein the predetermined time length is given by a parameter stored in parameter storage means.

* * * * *